US006806824B2

(12) United States Patent
Körnle et al.

(10) Patent No.: US 6,806,824 B2
(45) Date of Patent: Oct. 19, 2004

(54) APPARATUS AND METHOD FOR MEASURING THE DISTANCE TO AN OBJECT

(75) Inventors: Ralf Körnle, Zell am Harmersbach (DE); Karl Griessbaum, Mühlenbach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 10/325,462

(22) Filed: Dec. 20, 2002

(65) Prior Publication Data

US 2003/0146867 A1 Aug. 7, 2003

(30) Foreign Application Priority Data

Dec. 28, 2001 (DE) .......................................... 101 64 030

(51) Int. Cl.[7] .............................................. G01S 13/08
(52) U.S. Cl. ...................... 342/118; 342/124; 342/175; 342/127; 342/135
(58) Field of Search ................................ 342/118, 124, 342/127, 128, 129, 130, 134, 135, 175, 194, 195

(56) References Cited

U.S. PATENT DOCUMENTS

| | | | | |
|---|---|---|---|---|
| 3,599,208 A | * | 8/1971 | Nelson ............................ 34/92 |
| 3,618,087 A | | 11/1971 | Smith et al. .................. 343/7.7 |
| 3,890,617 A | * | 6/1975 | Moulton ........................ 342/94 |
| 4,119,963 A | | 10/1978 | Zwarts et al. .................. 343/17 |
| 4,315,260 A | | 2/1982 | Kupfer .......................... 342/86 |
| 4,334,224 A | * | 6/1982 | Gordon .......................... 342/37 |
| 4,521,778 A | | 6/1985 | Knepper ........................ 343/13 |
| 5,072,224 A | * | 12/1991 | Verbeke et al. .............. 342/152 |
| 5,241,317 A | * | 8/1993 | Howard ........................ 342/149 |
| 5,307,069 A | * | 4/1994 | Evans ............................ 342/19 |
| 6,087,978 A | | 7/2000 | Lalla et al. .................. 342/124 |
| 6,415,660 B1 | | 7/2002 | Sinz et al. ...................... 73/290 |
| 2002/0109626 A1 | | 8/2002 | Spanke ........................ 342/124 |
| 2003/0146867 A1 | * | 8/2003 | Kornle et al. ................ 342/124 |
| 2003/0169053 A1 | * | 9/2003 | Fujiwara ...................... 324/642 |

FOREIGN PATENT DOCUMENTS

DE 44 07 369 5/1994
EP 1324067 A * 8/2003

OTHER PUBLICATIONS

"A true logarithmic amplifier for radar IF applications", Barber, W.L.; Brown, E.R.; Solid–State Circuits, IEEE Journal of, vol. 15 Issue: 3 , Jun 1980 Page(s): 291–295.*

Skolnik, M.I., Radar Handbook New York, McGraw–Hill, 1990, $2^{nd}$ Edition, pp. 3–24 to 3–33.

Schleher, D.C., MTI and Pulsed Doppler Radar, Norwood, Artech–House, Inc., 1992, pp. 346/347.

* cited by examiner

Primary Examiner—John B. Sotomayor
(74) Attorney, Agent, or Firm—Gauthier & Connors LLP

(57) ABSTRACT

A radar fill level measurement sensor for measuring the level of material in a container, includes a transmit/receive circuit that transmits an electromagnetic pulse, and detects reflected electromagnetic pulses and provides an intermediate frequency signal indicative of the reflected electromagnetic pulses. A logarithm detector circuit receives the intermediate frequency signal and provides a logarithmic output signal indicative of the logarithm of the intermediate frequency signal. An evaluation unit receives and processes the logarithmic output signal, to determine the fill level of the material within the container, and provides a fill level measurement signal indicative thereof.

29 Claims, 8 Drawing Sheets

APPARATUS AND METHOD FOR MEASURING THE DISTANCE TO AN OBJECT

BACKGROUND OF THE INVENTION

The invention relates to the field fill level measurement sensors, and in particular to the field of radar fill level measurement sensors.

To measure the fill level in containers containing for example, liquids or bulk materials, sensors are often employed that utilize the radar principle to measure the propagation time of microwaves traveling from the sensor to the surface of the filling material and back. The microwaves (e.g., in the frequency range between about 1 GHz and 100 GHz) are usually emitted by an antenna as electromagnetic waves to the surface of the filling material, and electromagnetic waves reflected from the surface of the filling material are received at the antenna. Rather than an antenna, a waveguide may be used to conduct the electromagnetic waves to the filling material and back. In this embodiment, the reflection of the waves at the surface of the filling material is based on the change in the propagation impedance of the waveguide for the wave at the filling material surface.

A variety of known radar measuring techniques are used to measure the wave propagation time from the sensor to the measured surface and back. The two main radar measuring techniques are: (i) frequency-modulated continuous wave radar method (FMCW) and (ii) the pulse propagation time method (i.e., pulse radar).

In FMCW systems, the propagation time is measured indirectly by emitting a frequency-modulated signal and determining the difference between the instantaneous emitted and received frequencies. The difference between the signals is proportional to the distance between the sensor and the surface of the material in the container.

Pulse radar systems emit short microwave pulses (i.e., bursts), and determine the time interval between emission and reception of the pulses. The time interval is used to determine the distance between the sensor and filling material surface, and thus the fill level of the container. Since the usual measurement distances are in the range of up to a few meters, the measurement time intervals are extremely short, and as a result with pulse radar sensors the received echo signal usefully undergoes time dilation through a time transformation method. A method of this type is described in U.S. Pat. No. 4,521,778, which discloses a time-dilated echo signal that corresponds to the received high-frequency signal, but proceeds more slowly over time (e.g., by a factor of between 10,000 and 100,000). As a result, a carrier frequency (e.g., 5.8 GHz) for the microwave pulse becomes a carrier frequency of the time-dilated echo pulse of between, for example, 58 kHz and 580 kHz. Within the time-dilated echo signal, the time interval between the transmitted and received pulses may be determined by commonly available circuit components and methods for signal processing and subsequent time measurement, such as those also used by ultrasound fill level sensors.

An additional approach is disclosed in U.S. Pat. No. 6,087,978, wherein the time-dilated echo signal, often also called the intermediate-frequency (IF) signal, is demodulated. The resulting envelope curve signal is sampled and converted to digital values. A digital evaluation then determines the maxima of the transmission pulse and the echo pulse reflected by the measured surface. A disadvantage of this echo signal processing technique based on a linear envelope curve is that when one transmission pulse is reflected by multiple objects and as a result the received echo signal includes a plurality of individual echo pulses, not all of the echo pulses can be simultaneously detected given larger amplitude differences between the different echo pulses received. If the system amplification is adjusted to optimally display large-amplitude echo pulses, the small-amplitude echo pulses are no longer detectable. Conversely, when amplification is adjusted for weak echo pulses, the strong echo pulses are overloaded. This of course significantly impairs the correct evaluation of the echo signals since, of the plurality of pulses within the received echo signal, only one actually comes directly from the measured surface, and a priori one cannot generally say what strength this pulse has relative to other pulses of the echo. Therefore, to identify all possible relevant pulses of an echo signal, it may be necessary to sequentially evaluate a plurality of echoes of different amplitudes.

To avoid this disadvantage, M. Skolnik, *Radar Handbook*, second edition, McGraw-Hill, pages 3.25 ff, discloses a method in which a logarithmic envelope curve of the IF signal is generated instead of a linear envelope curve. This logarithmic output signal can represent for example a dynamic range of over 80 dB for the echo signal, with the result that very strong and very weak echo pulses may be simultaneously identified and processed within an IF signal by the evaluation unit. This approach makes it possible to acquire all the generated pulses simultaneously, even in containers that due to their characteristics generate spurious echo pulses in addition to the echo pulse from the filling material surface, and to determine which of these pulses is correct.

To improve measurement accuracy, German Patent 44 07 369 describes a method in which both the time difference between the transmission of the sampled signal and reception of the echo pulse is measured and evaluated, in addition to the phase difference between the sampled signal and the echo pulse. As a result, the envelope curve of the echo signal is generated in order to measure the time difference, while the IF signal is amplified in a parallel signal circuit and evaluated in terms of the relative phase position of the transmitted sampled signal and the received echo. While this approach achieves extremely precise measurement accuracy, the required complexity of the signal processing electronics is considerable. For example, the additional signal processing circuit for phase evaluation contains a quadrature demodulator and, at least one analog-digital converter (ADC) for sampling the I-Q output of the quadrature demodulator.

An alternative approach would be to sample the IF signal directly with a fast ADC and to perform the quadrature demodulation, and thus the phase evaluation in the discrete time domain. However, this approach also requires a relatively complex circuit due to the high amplitude dynamics of this signal, which requires an adjustable amplifier prior to the digitization.

Another approach to recovering the phase information from the echo of the IF signal is to use a limiter as described in the above-referenced book by Skolnik starting on page 3.30. The edges of the approximately rectangular output signal of the limiter mark the zero crossings of the echo pulse carrier. They may be used to trigger timers to determine the phase position of these echoes. Since use of the limiter obtains phase information at the expense of amplitude information, determination of the phase information is possible only in an additional parallel signal circuit for envelope curve processing which of course involves additional circuit complexity and cost.

Known prior art techniques for signal-processing an echo signal in a fill level system to measure the distance of an object either: (i) forego the increased measurement accuracy achievable by evaluation of the phase by limiting the approach to evaluating the envelope curve, or (ii) significantly increase the circuit complexity relative to a "simple" propagation-time-evaluation approach by providing a complex parallel signal processing circuit to extract phase information.

Therefore, there is a need for an improved signal processing technique in a pulse radar fill level sensor for measuring the distance to an object that provides fast detection of echo pulses of highly differentiated intensities, as well as extraction of the phase information for different echo pulses from the echo signal.

SUMMARY OF THE INVENTION

Briefly, according to an aspect of the invention, a radar fill level measurement sensor for measuring the level of material in a container includes a transmit/receive circuit that transmits an electromagnetic pulse, and detects reflected electromagnetic pulses and provides an intermediate frequency signal indicative of the reflected electromagnetic pulses. A logarithm detector circuit receives the intermediate frequency signal and provides a logarithmic output signal indicative of the logarithm of the intermediate frequency signal. An evaluation unit receives and processes the logarithmic output signal, to determine the fill level of the material within the container, and provides a fill level measurement signal indicative thereof.

By logarithmizing the received echo signal, the dynamic range in which a received echo pulse is identifiable and evaluatable is enhanced. The system measures a phase difference between the transmitted pulse-shaped signal and the echo pulse, and the time difference between these in the logarithmized echo signal.

Since the logarithmic output signal cannot be negative, it is not possible to use zero crossings to measure the phase difference. Instead the minima of the logarithmized echo are determined, preferably by differentiation.

In one embodiment, the received echo signal is input to a logarithmic detector circuit that includes a plurality of cascaded saturable amplifiers, wherein the output signals of the individual saturable amplifiers are summed to obtain the logarithm, then fed to an input of a following amplifier of the cascade as the input signal. The output of the last amplifier of this cascade supplies a signal that represents the echo signal that has been limited in its amplitude by saturation and amplified by the product of the gains of all of the cascade's amplifiers. Due to this high amplification outside the saturation range, this output signal contains nearly rectangular oscillation patterns such that their zero crossing points are an exact image of the zero crossings of the detected echo.

To measure the time difference between a transmitted signal and a desired pulse of the logarithmic echo signal, in one embodiment the logarithmic output signal is low-pass filtered to recover the envelope of the echo signal.

A method according to an aspect of the invention, which may be employed preferably in two designs based on the following description, uses the following common approach: extraction of a time difference signal between a reference pulse and an echo pulse of a pulse-propagation-time measurement, and correction of the time difference determined through measurement of the phase difference, where the time difference measurement and phase difference measurement share as many circuit components as possible.

In one embodiment, the logarithmized echo signal may be employed as the starting point for the time difference measurement, while the phase difference measurement is based on the limited echo signal also obtained during logarithmation.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
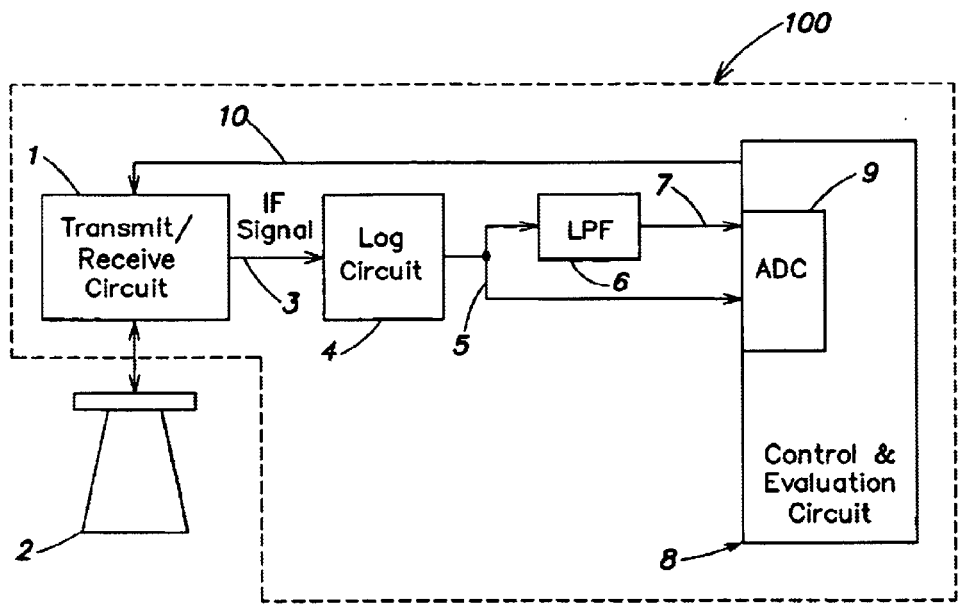
FIG. 1 is a block diagram illustration of a fill level measurement device.

FIG. 1 is a block diagram illustration of a radar fill level measurement device 100. The device includes a transmitter/receiver circuit 1 that provides periodic short microwave pulses, which are emitted through a transducer element 2 in the direction of the surface of a filling material to be measured. The transducer element 2 may include an antenna that emits an electromagnetic signal into free space, such as for example a horn antenna, a planar array antenna, or a dielectric antenna. However, the microwave pulses may also be fed to a waveguide (not shown) that is immersed in the filling material to be measured, the wave impedance of which is affected by the filling material.

The transducer element 2 receives an electromagnetic echo signal, which includes echo components reflected from the filling material surface, and where there is propagation into free space additional echo components (i.e., multipath components) such as from container walls. The transducer element 2 provides an electrical received echo signal to the transmitter/receiver circuit 1 indicative of the received echo signal. The electrical received echo signal is amplified, and then sampled using a pulse similar to the transmission pulse in order to perform a known, so-called sequential sampling procedure. The result of this procedure, also known as correlation, is a time-dilated echo signal or intermediate frequency (IF) signal that is provided on a line 3.

Figure 6A:
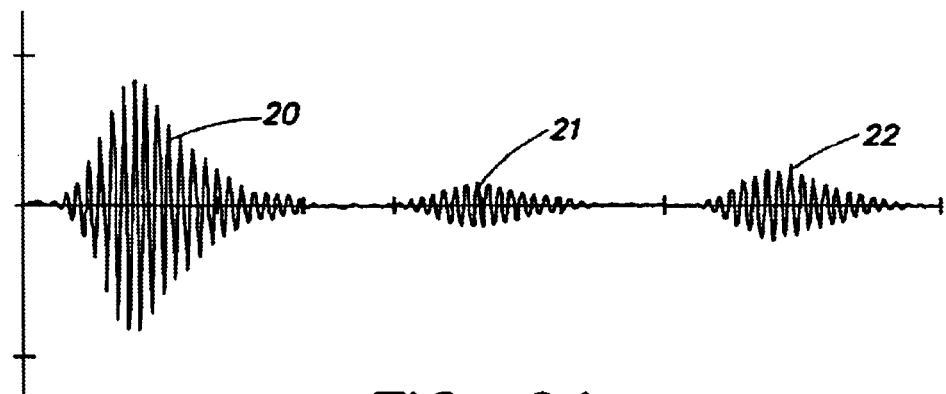
FIGS. 6A–6C are plots as a function of time (i) of an echo signal, (ii) of the logarithmic output signal, and (iii) of the envelope curve of the logarithmized output signal, respectively.

FIG. 6A is a plot of the IF signal on the line 3 (FIG. 1) as a function of time. As shown, the IF signal includes a plurality of pulses 20–22 with different amplitudes. The first and largest pulse 20 may, for example, be from a portion of the transmitted pulse that is coupled directly from the transmitter to the receiver of the transducer element 2. The time interval from the instant of transmission to receiving the first pulse 20 is relatively constant, and as a result may serve as a time reference for measuring the propagation time of the remaining received pulses 21–22. The two remaining pulses 21, 22 are associated with reflections. That is, the second pulse 21 is directly from the filling material surface, and the third pulse 22 is from a double reflection at the filling material surface. In the event of an unfavorable installation position of the transducer element 2 (FIG. 1) in the container, the third pulse 22 may be larger than the second pulse 21. Therefore, it is desirable that during the echo evaluation, all the echo pulses of a measurement cycle (i.e., all pulses attributable to the same transmission pulse) are detected and weighed against each other at the same time in order to distinguish the correct echo pulse emanating from the filling material surface based on predetermined rules.

Figure 6B:
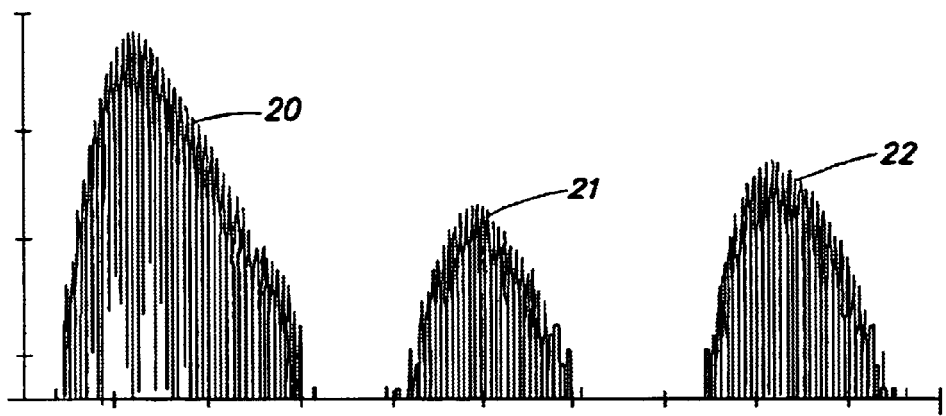

Referring again to FIG. 1, since the amplitude dynamic range of the IF signal on the line 3 may be greater than 80 dB, the logarithm detector/circuit 4 compresses the echo amplitudes. Specifically, the logarithm circuit 4 receives and processes the IF signal on the line 3, and delivers a detected and logarithmic output signal on a line 5. The logarithmic output signal on the line 5 is indicative of the logarithm of the IF rectified signal on the line 3. FIG. 6B is a plot of the logarithmic output signal on the line 5 as a function of time.

Figure 6C:
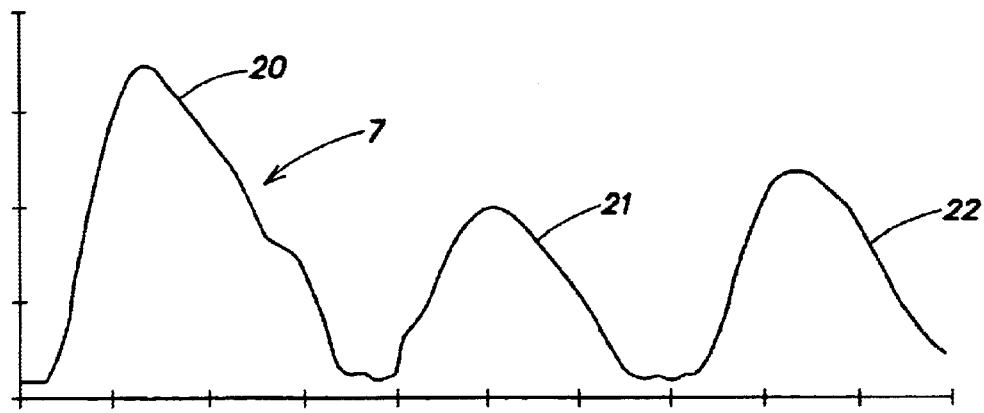

The logarithmic output signal on the line 5 is input to a low-pass filter 6, which provides a filtered output signal on a line 7. FIG. 6C is a plot of the filtered output signal on the line 7 as a function of time.

The filtered output signal on the line 7 and the logarithmic output signal on the line 5 are input to a control and evaluation circuit 8. This circuit includes an analog-to-digital converter (ADC) 9, a microcontroller (not shown), with volatile and non-volatile memory (e.g., RAM, ROM, and EEPROM), an input/output unit, and a power supply. The microcontroller initiates a measurement cycle by sending a control signal on a line 10 to the transmitter/receiver circuit 1, and then evaluates the signals on lines 5, 7 that have been digitized by the ADC 9.

By measuring the time intervals between the coupled pulse 20 (FIG. 6A) and the echo pulses 21, 22 (FIG. 6A) of the filtered output signal on the line 7, the control/evaluation unit 8 determines the propagation time of the echo signals and the distance to the fill material based on knowledge of the signal propagation speed. The time intervals may be measured, for example, based on the time difference between the individual maxima of the filtered output signal on the line 7, or on the time difference between certain points on the echo edges, the respective amplitude of which is determined by a given fraction of the maximum amplitude of the specific echo pulse. Based on knowledge of the intervals and amplitudes for all the pulses 20, 21, 22 (FIG. 6A), the control/evaluation circuit 8 selects the pulse that originates with the greatest probability from a simple reflection at the filling material surface. The accuracy of the final measurement result depends on the edge steepness of the transmitted pulse—measurement accuracy of less than a half-wavelength of the microwave pulse is attainable.

Based on the sampled values of the logarithmic output signal on the line 5, the control and evaluation circuit 8 calculates the instants of the zero crossings for the IF signal on the line 3, and thus the phase shifts for the echo pulses 21, 22 (FIG. 6A) relative to the transmission pulse. Possible path lengths for the signal from the transducer element 2 to the filling material surface and back, which are compatible with the phase shift measured this way, lie not more than a half-wavelength of the microwave signal apart. Given sufficient accuracy of the propagation time measurement of the filtered output signal on the line 7, there is a value in the accuracy interval of this measurement that is compatible with the measured phase shift and that represents the true distance of the filling material surface from the transducer element 2. The combination of time difference and phase difference measurement improves measurement accuracy.

The circuit shown in FIG. 1 includes a fast, high-resolution ADC 9 to digitize the signals on the lines 5 and 7. The ADC 9 may be replaced by two ADC converters, one of which converts only the slow changing filtered output signal on the line 7. However, the functional speed of the ADC provided for the logarithmic output signal on the line 5 must be greater than double the intermediate frequency.

Figure 2:
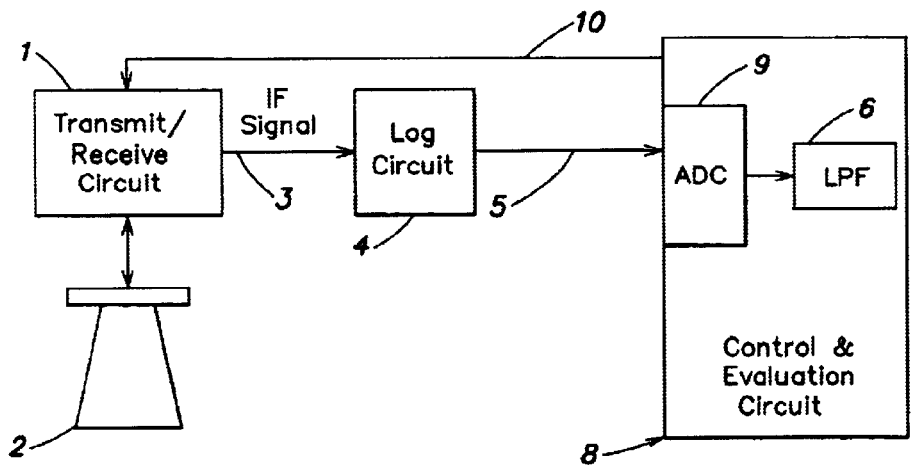
FIG. 2 is a block diagram illustration of an alternative embodiment fill level measurement device.

The circuit complexity for analog-to-digital conversion may be reduced if, as shown in FIG. 2, the logarithmic output signal on the line 5 is input to a single ADC 9 of the control and evaluation circuit 8, and the low-pass filtering required for the time difference measurement to generate the envelope curve is performed using a digital filter 60, implemented by appropriate software executing in the microcontroller.

Figure 3:
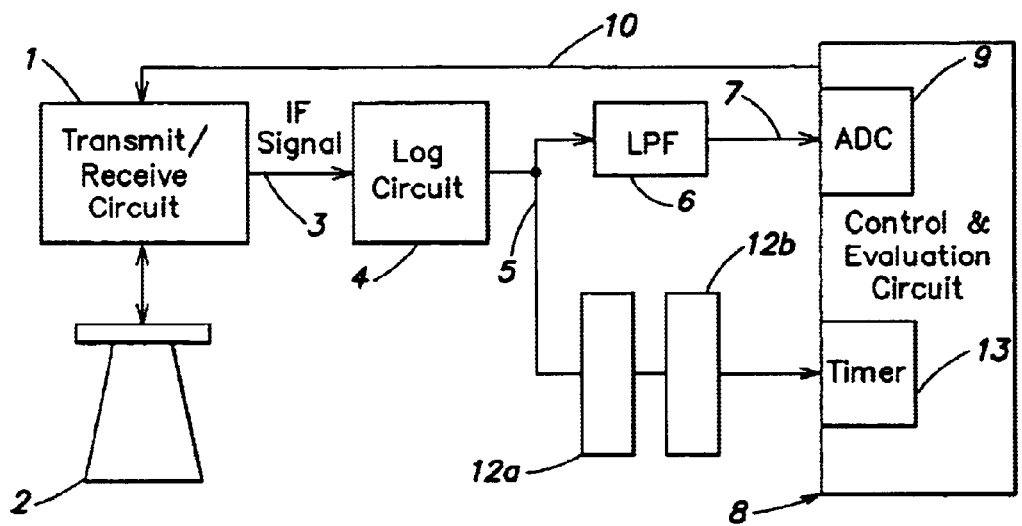
FIG. 3 is a block diagram illustration of an yet another alternative embodiment fill level measurement device.

Another variant of the circuit arrangement according to the invention is shown in FIG. 3. This embodiment is substantially the same as the embodiment illustrated in FIG. 1, with the principal exception that two cascaded differentiating circuits 12a–12b have been added, and provide a signal indicative of the second derivative over time of the logarithmic output signal on the line 5 to the control and evaluation circuit 8.

Figure 7A:
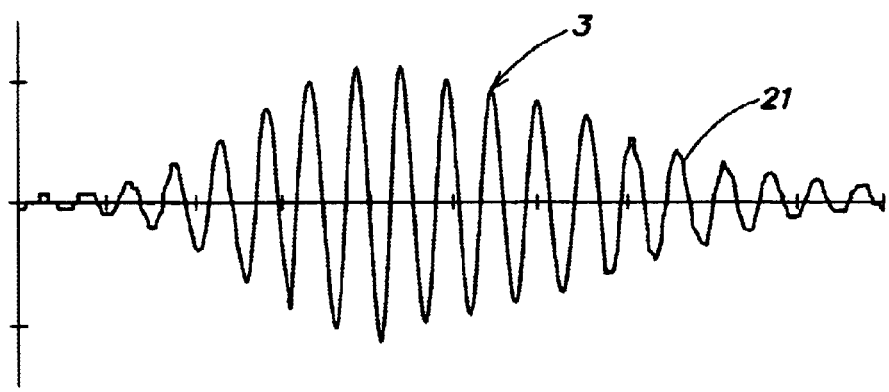
FIGS. 7A–7C are plots as a function of time, on a magnified time scale with respect to FIGS. 6A–6C, of (i) a portion of the echo signal, (ii) of the logarithmic output signal, and (iii) of the second derivative with respect to time of the logarithmic output signal, respectively.
Figure 7B:
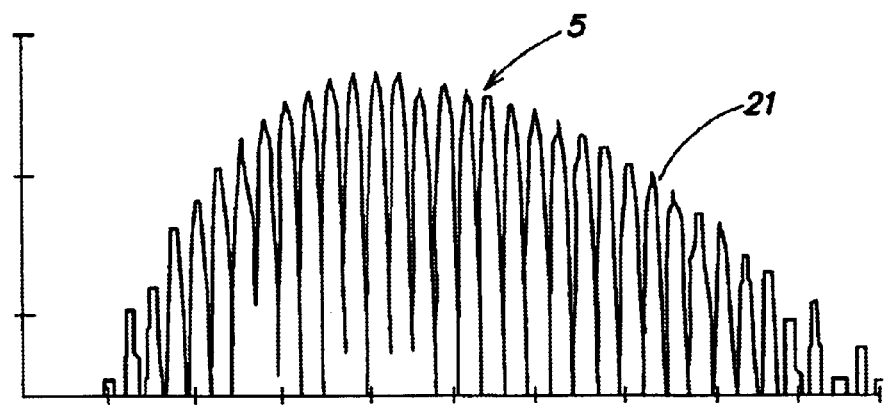
Figure 7C:
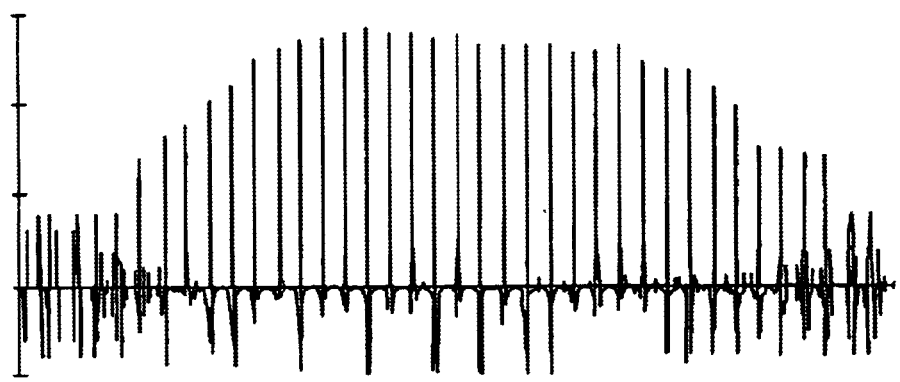

FIGS. 7A–7C are plots as a function of time, on a magnified time scale with respect to FIGS. 6A–6C, of (i) a portion of the echo signal, (iii) of the logarithmized pulse, and (iii) of the second derivative with respect to time of the logarithmized pulse, respectively. FIG. 7A shows a pulse at magnified scale, for example the second pulse 21 of the echo signal on the line 3 transformed to intermediate frequency. FIG. 7B shows the same pulse 21 of the logarithmic output signal on the line 5. Significantly, each zero crossing of the original IF signal on the line 3 is replaced here by a sharp local minimum. The second derivative as a function of time of logarithmic output signal on the line 5 results in the characteristic curve shown in FIG. 7C, where each of these local minima corresponds to a short positive pulse.

The signal illustrated in FIG. 7C is output from the second differentiating circuit 12b to the measurement and evaluation circuit 8. In order to measure a zero crossing instant for the signal on the line 3, it is not necessary to digitize the output signal from the differentiating circuit 12b. It is sufficient to normalize the short positive pulses (e.g., using a Schmitt trigger), and then to feed them to a timer 13 of the measurement and evaluation circuit 8. This allows the phase position of the individual pulses 20–22 (FIG. 6A) of the echo signal to be determined in a relatively simple manner.

Figure 4:
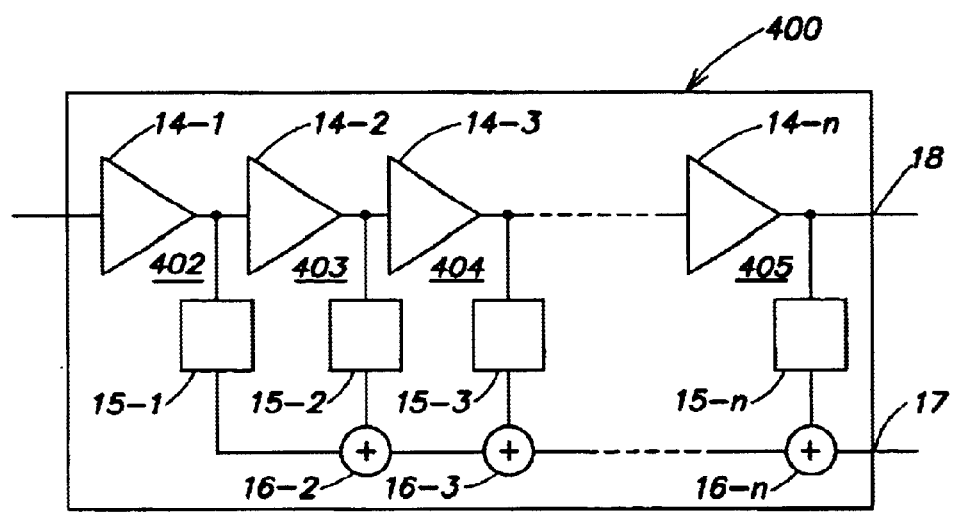
FIG. 4 is a block diagram illustration of a logarithmic detector circuit.

FIG. 4 is a block diagram illustration of a logarithm detector circuit 400. The logarithm circuit 400 includes a plurality of stages 402–405, each of which includes a limiter 14-1, 14-2, . . . 14-n, respectively. The input of the limiter 14-1 associated with the first stage forms the signal input of the logarithm circuit, and the inputs of the limiters 14-2, . . . 14-n of the subsequent stages are each connected to the outputs of limiters 14-1, . . . 14-(n−1) of the respective prior stage. Each stage i, i−1, . . . n also includes an associated detector 15-i, the input of which is connected to the output of the limiter 14-i of the same stage, and each output of which is connected to an input of a summation element 16-2, 16-3, . . . 16-n of a chain of cascaded summation elements.

The output of the last summation element 16-n of the cascade forms a first output signal on a line 17 of the logarithm circuit 400. The output signal on the line 17 is essentially proportional to the number of limiters driven to saturation by an applied input signal and thus represents, since the gain of all the limiters 14-1, 14-2, . . . 14-n is the same, a good approximation to the logarithm of the detected input signal. Strictly speaking, the characteristic of the limiter cascade is not an exact logarithm, but rather a concatenation of straight-line segments. However, this is not a problem for the purposes of the invention, since mathematical precision is not required here, and if necessary, the characteristic can approximate as precisely as required a logarithmic function by increasing the number of limiters and stabilizing the overall gain of the limiter cascade.

Figure 8A:
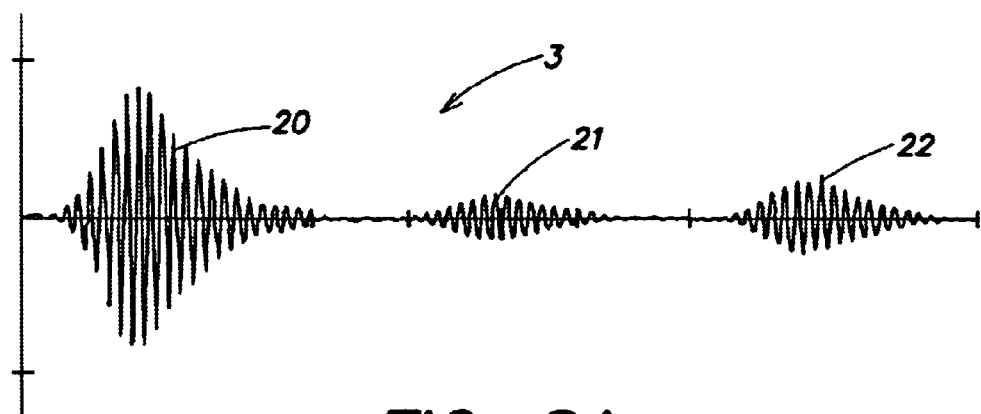
FIGS. 8A–8C are plots as a function of time, (i) of the echo signal, (ii) of the output signal generated from this echo signal which has been logarithmized and then low-pass-filtered, and (iii) of the output signal of the last amplifier resulting from this echo signal, respectively.
Figure 8B:
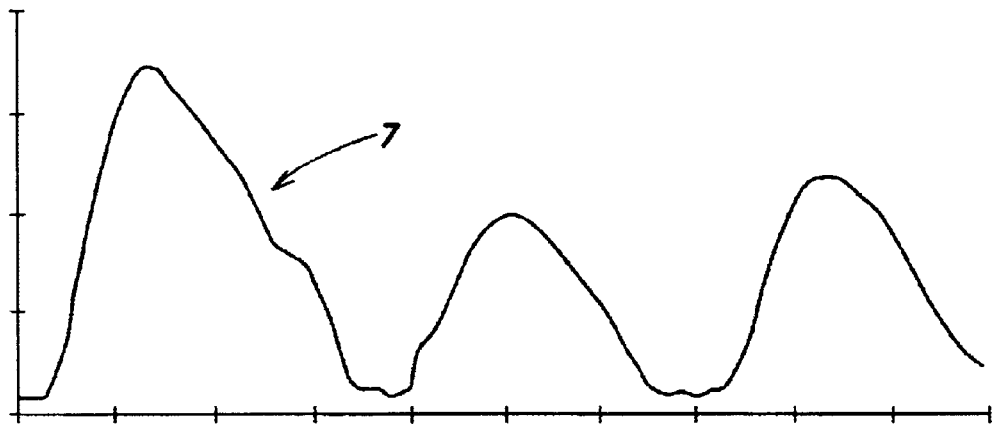
Figure 8C:
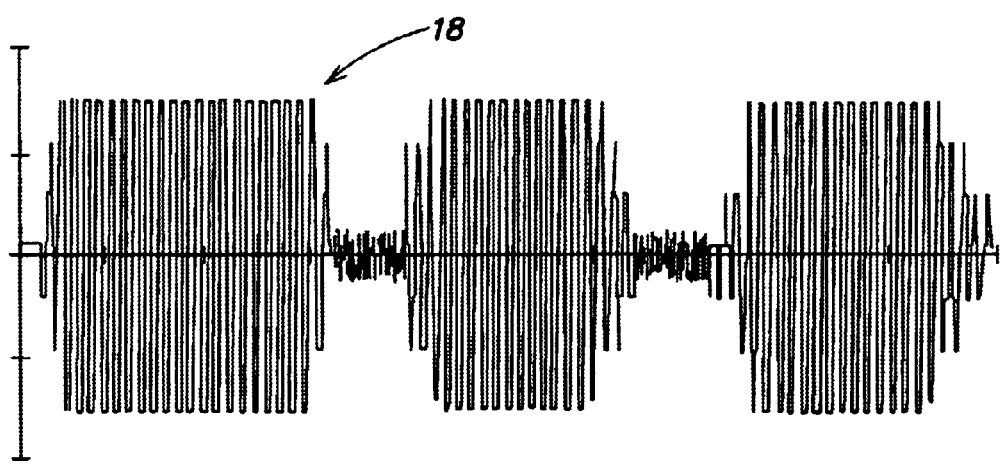
Figure 9A:
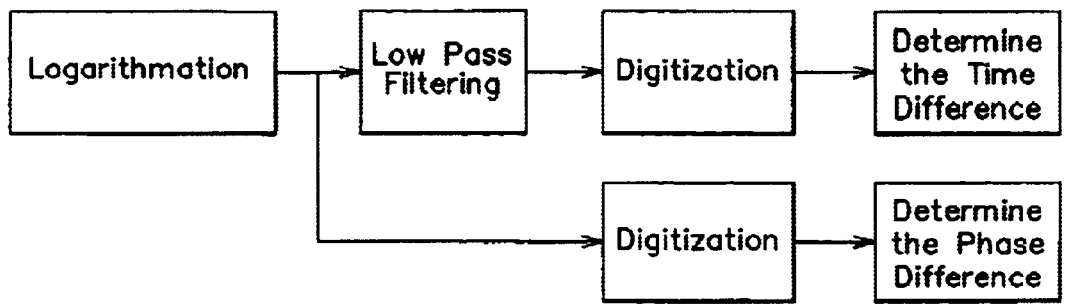
FIGS. 9A–9D and 10A–10D are block diagram illustrations of processing steps.
Figure 9B:
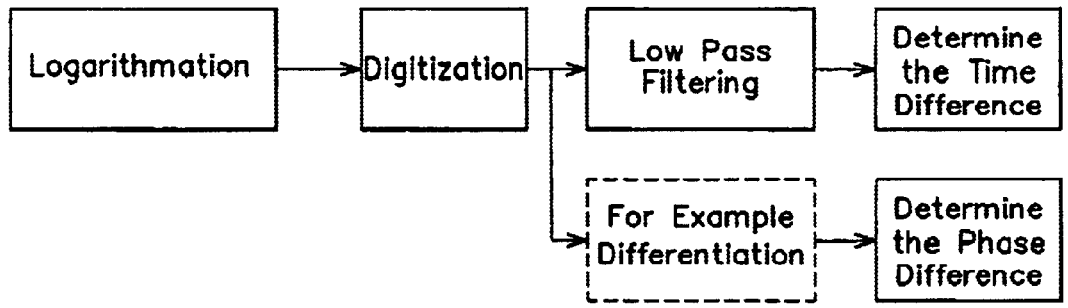
Figure 9C:
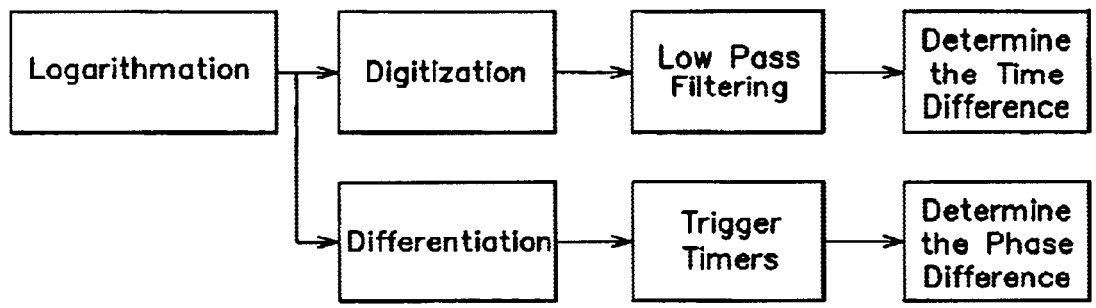
Figure 9D:
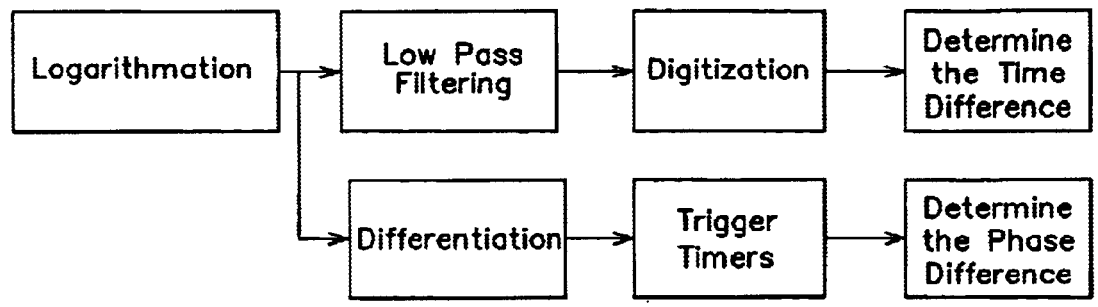
Figure 10A:
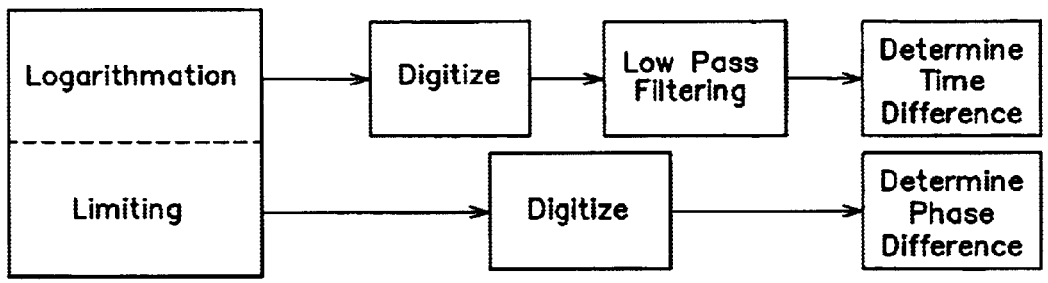
Figure 10B:
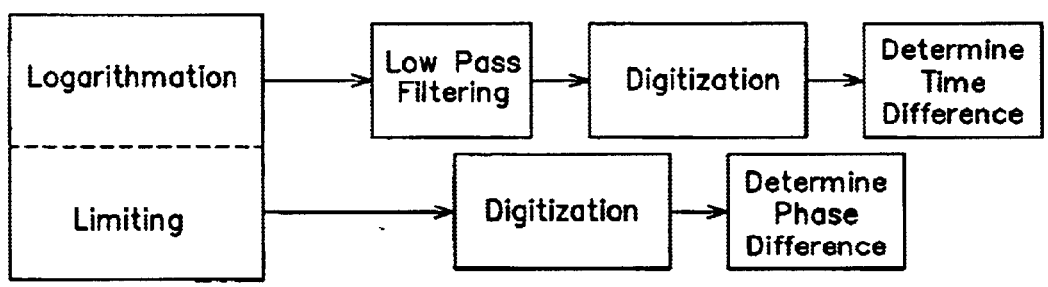
Figure 10C:
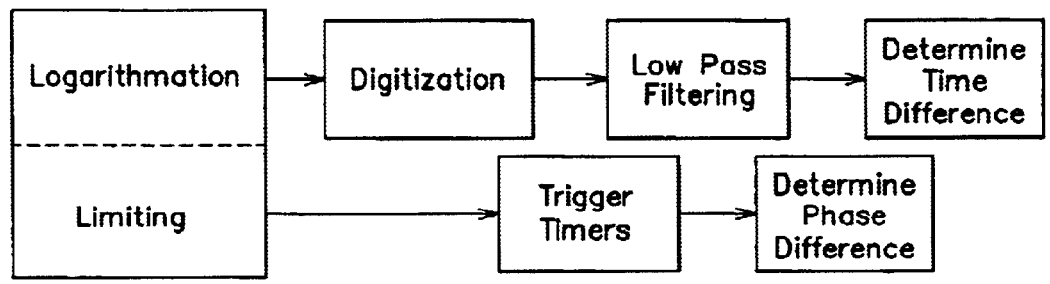
Figure 10D:
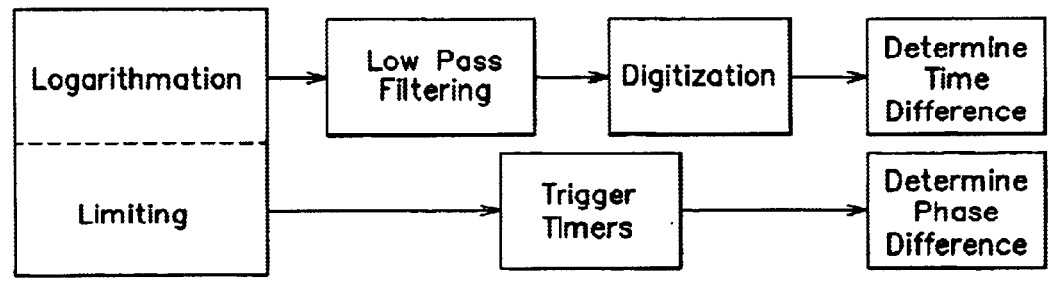

The logarithm circuit 400 also provides a second output signal on a line 18, which is output from the limiter 14-n of the last stage. This limiter 14-n is always the first one of the entire limiter cascade that goes into saturation. FIG. 8C illustrates the characteristic of the second output signal on the line 18 in the characteristic curve of the intermediate frequency echo signal IF shown in FIG. 8A. As shown, the second output signal on the line 18 is practically always saturated whenever an echo pulse 20, 21, 22 (FIG. 8A) arrives at the transducer element 2 (FIG. 1). Due to the high edge steepness of the second output signal on the line 18, the instants of zero crossing are measurable with high accuracy and may be used, as described above, to trigger a timer of the control and evaluation circuit 8 for phase measurement of the echo signal.

Figure 5:
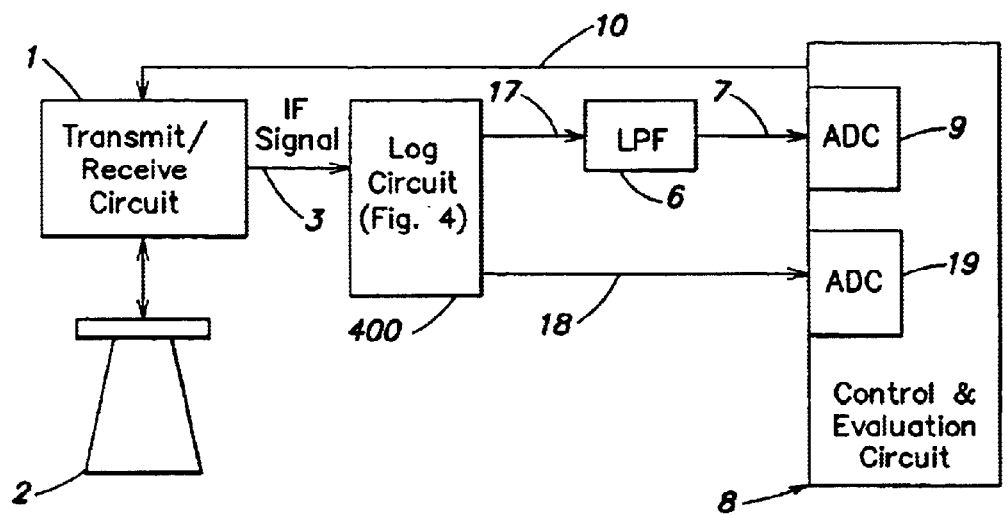
FIG. 5 is a block diagram illustration of a fill level measurement device that includes the logarithmic circuit of FIG. 4.

FIG. 5 shows a circuit arrangement for distance measurement that uses the logarithm circuit 400 of FIG. 4. As described with respect to FIGS. 1 and 3, the logarithmic output signal on the line 17 is filtered by the LPF 6, the resultant filtered signal is output on the line 7 to the ADC 9. This ADC 9 processes only the relatively slow-changing, low-pass-filtered echo signal on the line 7, and therefore does not need to reach an extremely high operating speed.

The second output signal on the line 18 is input to a converter 19, which unlike the ADC 9, does not require high resolution; it must simply be able to differentiate the positive and negative saturation levels from an unsaturated signal level of the second output signal on the line 18. This input converter may, for example, be constructed from two comparators or Schmitt triggers (not shown) and enables measurement of the zero crossings of the second output signal on the line 18, and thus measurement of the phase of echo pulses 20, 21, 22 (FIG. 8A) at high resolution.

In an alternative embodiment, one or more timers within the control and evaluation circuit 8 replace the second input converter 19, the timer being directly started and later stopped by the alternatively positive or negative edges of the second output signal on the line 18. For example, a given positive edge of the overcoupled transmitted pulse 20 starts a timer, and a given positive edge of the received pulse 21 (FIG. 8A) stops this timer. Enabling of the start or stop input of the timer occurs through certain time slots that are set by the control and evaluation circuit 8 based on the approximate time position of the relevant echo pulses from a previous measurement.

Given knowledge of the period of a wavelength, the time difference determined by the timer can be converted to a whole-number multiple of 360° plus the supplementary angle less than 360°. By addition or subtraction of k*360° (k=0, 1, 2, 3 . . . ) to/from the preliminary phase difference, the final phase difference may be determined that is compatible with the echo interval produced by evaluation of the time interval between corresponding pulses of echo signal on the line 7. "Compatible" here indicates that the echo intervals from the time difference measurement and phase difference measurement differ by a maximum of a half-wavelength of the IF signal on the line 3. The result of this time difference measurement must be viewed as a rough measurement that is corrected by the result from the phase difference measurement.

Although not shown, a differentiating circuit 12 may be positioned in the circuit of FIG. 5 between the output signal on the line 18 and the input converter 19, which converts each sign change of the signal to a short positive or negative pulse.

An added advantage of using logarithm circuit 400 is that selective triggering of the timer is possible only given rising or falling edges of the second output signal on the line 18. In other words, whereas the circuit arrangement of FIG. 3 allows phase measurement only in the range between 0° and 180°, the circuit arrangement of FIG. 5 enables phase measurement in the 0° to 360° range. The demands on the measurement accuracy of the time displacement between the envelope curves of the individual echo pulses is thus less than in FIG. 3; it is nevertheless possible to achieve the same resolution in the distance measurement.

FIGS. 9A–9D and FIGS. 10A–10D are block diagram illustrations of processing steps associated with various embodiments of a fill level measurement sensor.

Although the present invention has been discussed in the context of a logarithm detector circuit 400 illustrated in FIG. 4, one of ordinary skill in the art will recognize that a number of different logarithm detector circuits may be used to provide the logarithm output signal.

Although the present invention has been shown and described with respect to several preferred embodiments thereof, various changes, omissions and additions to the form and detail thereof, may be made therein, without departing from the spirit and scope of the invention.

What is claimed is:

1. A method for measuring the distance of an object, comprising:
   a) emitting a pulse-shaped signal from a transmitter (2) to the object;
   b) receiving an echo pulse (3; 21, 22) of the pulse-shaped signal;
   c) measuring a time difference between the transmission of the pulse-shaped signal and reception of the echo pulse (21, 22);
   d) measuring a phase difference between the transmitted pulse-shaped signal and the echo pulse (21, 22);
   e) determining a distance as the measured distance of the object, which distance is compatible with the measured time difference and the measured phase difference after taking into account the propagation speed of the signal; characterized in that the echo pulse (3; 21, 22) received in step b) is logarithmized, and that the steps d) and e) are performed on the logarithmized echo pulse (5; 21, 22).

2. The method of claim 1, characterized in that minima of the logarithmized echo pulse (5; 21, 22) are determined in order to measure the phase difference in step d).

3. The method of claim 2, characterized in that the minima of the logarithmized echo pulse (5; 21, 22) are determined by differentiation.

4. The method of claim 1, wherein logarithmation is performed using a cascade of saturable limiters (14-1, ..., 14-n), the outputs of which are detected and added to form the logarithmized echo signal (5; 21, 22).

5. A method for measuring the distance of an object, comprising:
   a) emitting a pulse-shaped signal from a transmitter to the object;
   b) receiving an echo pulse (3; 21, 22) of the pulse-shaped signal;
   c) measuring a time difference between the transmission of the pulse-shaped signal and reception of the echo pulse (3; 21, 22) of the echo;
   d) measuring a phase difference between the transmitted pulse-shaped signal and the echo pulse (3; 21, 22);
   e) determining a distance as the measured distance of the object, which distance is compatible with the measured time difference and the measured phase difference after taking into account the propagation speed of the signal;
   characterized in that the echo received in step b) is logarithmized by a cascade of saturable limiters (14-1, ... 14-n), the output signals of which are detected and added to obtain the logarithm, that step c) is performed on the logarithmized echo pulse (5; 21, 22), and that step d) is performed on the output signal (18) of the last limiter (14-n) of the cascade.

6. The method of claim 5, characterized in that step d) comprises differentiation of the output signal (18) of the last limiter.

7. The method of claim 5, wherein the logarithmized echo pulse (5; 21, 22) is first passed through a low-pass filter to measure the time difference.

8. The method of claim 7, wherein the logarithmized echo pulse (5; 21, 22) is digitized, and that the low-pass filtering and measurement of the time difference and the phase difference are performed on the digitized logarithmized echo.

9. The method of claim 7, wherein the low-pass-filtered logarithmized echo pulse (7; 21, 22) and the output signal (18) of the last limiter (14-n) are digitized, and that measurement of the time difference is performed on the digitized, low-pass-filtered, logarithmized echo pulse (7; 21, 22) and measurement of the phase difference is performed on the digitized output signal of the last limiter (14-n).

10. The method of claim 5, wherein transformation of the echo pulse to an intermediate frequency is performed before logarithmation.

11. A circuit arrangement for measuring the distance of an object based on the echo of a pulse-shaped signal reflected from the object, comprising:
   a first measurement circuit (8) to measure the time difference between the transmission of the pulse-shaped signal and reception of an echo pulse (3; 21, 22);
   a second measurement circuit (8) to measure a phase difference between the transmitted pulse-shaped signal and the echo pulse (3; 21, 22); and
   an evaluation circuit (8) to determine a distance as the measured distance of the object, which distance is compatible with the measured time difference and the measured phase difference after taking into account the propagation speed of the signal, characterized in that a logarithmation circuit to logarithmize the echo pulse is placed before each signal input (9, 19) of the first and second measurement circuit.

12. The circuit arrangement of claim 11, wherein the second measurement circuit (8) includes a differentiation circuit (12) to differentiate the logarithmized echo.

13. The circuit arrangement of claim 11, wherein the logarithmation circuit includes a cascade of saturable limiters (14-1, ..., 14-n), where the output of each limiter (14-1, ..., 14-(n-1)) is connected, except the last one (14-n), to the input of a following limiter (14-2, ..., 14-n) and to an input of a detector (15-1, ..., 15-n), and where the outputs of the detectors (15-1, ..., 15-n) are connected to the inputs of a summation circuit (16-2, ..., 16-n), the output (17) of which supplies the logarithmized echo signal (5).

14. A circuit arrangement for measuring the distance of an object based on the echo of a pulse-shaped signal reflected from the object, comprising:
   a first measurement circuit (8) to measure the time difference between the transmission of the pulse-shaped signal and reception of an echo pulse (3; 21, 22);
   a second measurement circuit (8) to measure a phase difference between the transmitted pulse-shaped signal and the echo pulse (3; 21, 22); and
   an evaluation circuit (8) to determine a distance as the distance of the measured object, which distance is compatible with the measured time difference and the measured phase difference after taking into account the propagation speed of the signal, characterized by a logarithmation circuit (400) which includes a cascade of saturable limiters (14-1, ... 14-n), detectors (15-1, ..., 15-n), and a summation circuit (16-2, ... 16-n), where the output of each limiter (14-1, ..., 14-(n-1)) is connected, except the last one (14-n), to the input of a following limiter (14-2, ..., 14-n) and to an input of a detector (15-1, ..., 15-n), and where the outputs of the detectors (15-1, ..., 15-n) are connected to the inputs of a summation circuit, the output (17) of which supplies the logarithmized echo signal (5) to the first measurement circuit (8), and where the output (18) of the last limiter (14-n) supplies an input signal for the second measurement circuit (8).

15. The circuit arrangement of claim 14, further comprising a differentiating circuit (12) to differentiate the output signal (18) of the last limiter (14-n) is placed before the second measurement circuit (8).

16. The circuit arrangement of claim 14, comprising a low-pass filter (6) is placed before the first measurement circuit (8).

17. The circuit arrangement of claim 16, wherein the measurement circuits (8) and the low-pass filter (6) are implemented by a microcontroller, and that an AD converter (9) is located between the output of the logarithmation circuit (4) and an input of the microcontroller.

18. The circuit arrangement of claim 16, wherein the measurement circuits (8) and the low-pass filter (6) are implemented by a microcontroller, and an AD converter (9, 19) is located between the output of the logarithmation circuit and an input of the microcontroller, as well as between the output (18) of the last limiter (14-n) and an input of the microcontroller.

19. A radar fill level measurement sensor for measuring the level of material in a container, said sensor comprising:
- means for generating an electromagnetic pulse, for transmitting said electromagnetic pulse, and for detecting reflected electromagnetic pulses and providing an intermediate frequency signal indicative of said reflected electromagnetic pulses;
- a logarithm detector circuit that receives said intermediate frequency signal and provides a logarithmic output signal indicative of the logarithm of said intermediate frequency signal; and
- means, responsive to said logarithmic output signal, for determining the fill level of the material within the container, and for providing a fill level measurement signal indicative thereof.

20. The radar fill level measurement sensor of claim 19, wherein said means for determining the fill level comprises:
- means, responsive to said logarithmic output signal, for determining a time difference between said transmitted electromagnetic pulse and said pulses within said reflected electromagnetic pulses, and providing a time difference signal indicative thereof;
- means, responsive to said logarithmic output signal, for determining a phase difference between said transmitted electromagnetic pulse and said pulses within said reflected electromagnetic pulses, and providing a phase difference signal indicative thereof; and
- means, responsive to said time difference signal and said phase difference signal, for determining the fill level of the material within the container, and for providing said fill level measurement signal indicative thereof.

21. The radar fill level measurement sensor of claim 19, wherein said logarithm detector circuit comprises a plurality of cascaded amplifiers configured and arranged to provide said logarithmic output signal.

22. The radar fill level measurement sensor of claim 19, wherein said means for determining the fill level of the material within the container comprises a processor.

23. The radar fill level measurement sensor of claim 19, wherein said means for determining a time difference comprises:
- a low pass filter that receives said logarithmic output signal and provides a filtered logarithmic output signal indicative thereof;
- an analog-to-digital converter that receives said filtered logarithmic output signal and provides a filtered discrete time logarithmic output signal indicative thereof; and
- a control and evaluation circuit that receives said filtered discrete time logarithmic output signal and provides said time difference signal.

24. The radar fill level measurement sensor of claim 19, wherein said means for determining a phase difference comprises:
- an analog-to-digital converter that receives said logarithmic output signal and provides a discrete time logarithmic output signal indicative thereof;
- wherein said control and evaluation circuit receives said discrete time logarithmic output signal and provides said phase difference signal.

25. The radar fill level measurement sensor of claim 19, wherein said means for determining a phase difference comprises:
- a differentiation circuit that receives said logarithmic output signal, and provides a differentiation output signal indicative of the second derivative of said logarithmic output signal with respect to time;
- wherein said control and evaluation circuit receives said differentiation output signal and provides said phase difference signal.

26. The radar fill level measurement sensor of claim 25, wherein said control and evaluation circuit includes a timer that is controlled by said differentiation output signal, and provides a count signal indicative of said phase difference signal.

27. The radar fill level measurement sensor of claim 19, wherein said means for determining a time difference comprises:
- an analog-to-digital converter that receives said logarithmic output signal and provides a discrete time logarithmic output signal indicative thereof;
- a low pass filter that receives said discrete time logarithmic output signal and provides a filtered discrete time logarithmic output signal indicative thereof; and
- a control and evaluation circuit that receives said filtered discrete time logarithmic output signal and provides said time difference signal.

28. A radar fill level measurement sensor for measuring the level of material in a container, said sensor comprising:
- an antenna that transmits an electromagnetic pulse, and receives reflected electromagnetic pulses from the material and the container, and provides an electrical received signal indicative thereof;
- a transmit/receive circuit that generates said electromagnetic pulse, and receives said electrical received signal and generates an intermediate frequency signal indicative thereof;
- a logarithm detector circuit that receives said intermediate frequency signal and provides a logarithmic output signal indicative of the logarithm of said intermediate frequency signal; and
- a processor that receives and processes said logarithmic output signal to determine the fill level of the material within the container, and provides a fill level measurement signal indicative thereof.

29. The radar fill level measurement sensor of claim 28, wherein said logarithm detector circuit comprises a plurality of cascaded amplifiers configured and arranged to provide said logarithmic output signal.

* * * * *

UNITED STATES PATENT AND TRADEMARK OFFICE
CERTIFICATE OF CORRECTION

PATENT NO.    : 6,806,824 B2
DATED         : October 19, 2004
INVENTOR(S)   : Körnle et al.

It is certified that error appears in the above-identified patent and that said Letters Patent is hereby corrected as shown below:

Column 1,
Line 41, after "and" insert -- the -- and delete "filling material"
Line 42, after "surface" insert -- of the material in the container --

Column 4,
Line 33, after "signal," delete "(iii)" and replace it with -- (ii) --

Column 5,
Line 35, after "IF" delete "rectified"
Line 38, after "low-pass filter" insert -- (LPF) --
Lines 53 and 64, delete "control/evaluation" and insert -- control and evaluation --

Column 6,
Line 32, after "filter" delete "60" and insert -- 6 --
Line 45, after "signal," delete "(iii)" and insert -- (ii) --
Line 65, delete "20-22" and insert -- 21-22 --

Column 7,
Line 61, delete "20, 21, 22" and insert -- 21 and 22 --

Column 8 thru Column 10,
Lines 55-67, should read as follows:

1. A method for measuring the distance of an object, comprising:
   a) emitting a pulse-shaped signal from a transmitter to the object;
   b) receiving an echo pulse of the pulse-shaped signal;
   c) measuring a time difference between the transmission of the pulse-shaped signal and reception of the echo pulse;
   d) measuring a phase difference between the transmitted pulse-shaped signal and the echo pulse;
   e) determining a distance as the measured distance of the object, which distance is compatible with the measured time difference and the measured phase difference after taking into account the propagation speed of the signal;
   characterized in that the echo pulse received in step b) is logarithmized, and that the steps d) and e) are performed on the logarithmized echo pulse.

2. The method of claim 1, characterized in that minima of the logarithmized echo pulse are determined in order to measure the phase difference in step d).

3. The method of claim 2, characterized in that the minima of the logarithmized echo pulse are determined by differentiation.

4. The method of claim 1, wherein logarithmation is performed using a cascade of saturable limiters, the outputs of which are detected and added to form the logarithmized echo signal.

UNITED STATES PATENT AND TRADEMARK OFFICE
CERTIFICATE OF CORRECTION

PATENT NO. : 6,806,824 B2
DATED : October 19, 2004
INVENTOR(S) : Körnle et al.

It is certified that error appears in the above-identified patent and that said Letters Patent is hereby corrected as shown below:

Column 8 and Column 10, cont'd,

5. A method for measuring the distance of an object, comprising:
   a) emitting a pulse-shaped signal from a transmitter to the object;
   b) receiving an echo pulse of the pulse-shaped signal;
   c) measuring a time difference between the transmission of the pulse-shaped signal and reception of the echo pulse of the echo;
   d) measuring a phase difference between the transmitted pulse-shaped signal and the echo pulse;
   e) determining a distance as the measured distance of the object, which distance is compatible with the measured time difference and the measured phase difference after taking into account the propagation speed of the signal;
   characterized in that the echo received in step b) is logarithmized by a cascade of saturable limiters, the output signals of which are detected and added to obtain the logarithm, that step c) is performed on the logarithmized echo pulse, and that step d) is performed on the output signal of the last limiter of the cascade.

6. The method of claim 5, characterized in that step d) comprises differentiation of the output signal of the last limiter.

7. The method of claim 5, wherein the logarithmized echo pulse is first passed through a low-pass filter to measure the time difference.

8. The method of claim 7, wherein the logarithmized echo pulse is digitized, and that the low-pass filtering and measurement of the time difference and the phase difference are performed on the digitized logarithmized echo.

9. The method of claim 7, wherein the low-pass-filtered logarithmized echo pulse and the output signal of the last limiter are digitized, and that measurement of the time difference is performed on the digitized, low-pass-filtered, logarithmized echo pulse and measurement of the phase difference is performed on the digitized output signal of the last limiter.

10. The method of claim 5, wherein transformation of the echo pulse to an intermediate frequency is performed before logarithmation.

11. A circuit arrangement for measuring the distance of an object based on the echo of a pulse-shaped signal reflected from the object, comprising:

a first measurement circuit to measure the time difference between the transmission of the pulse-shaped signal and reception of an echo pulse;
   a second measurement circuit to measure a phase difference between the transmitted pulse-shaped signal and the echo pulse; and
   an evaluation circuit to determine a distance as the measured distance of the object, which distance is compatible with the measured time difference and the measured phase difference after taking into account the propagation speed of the signal,
   characterized in that a logarithmation circuit to logarithmize the echo pulse is placed before each signal input of the first and second measurement circuit.

12. The circuit arrangement of claim 11, wherein the second measurement circuit includes a differentiation circuit to differentiate the logarithmized echo.

13. The circuit arrangement of claim 11, wherein the logarithmation circuit includes a cascade of saturable limiters, where the output of each limiter is connected, except the last one, to the input of a following limiter and to an input of a detector, and where the outputs of the detectors are connected to the inputs of a summation circuit, the output of which supplies the logarithmized echo signal.

UNITED STATES PATENT AND TRADEMARK OFFICE
CERTIFICATE OF CORRECTION

PATENT NO. : 6,806,824 B2
DATED : October 19, 2004
INVENTOR(S) : Körnle et al.

It is certified that error appears in the above-identified patent and that said Letters Patent is hereby corrected as shown below:

Column 8 thru Column 10, cont'd,

14. A circuit arrangement for measuring the distance of an object based on the echo of a pulse-shaped signal reflected from the object, comprising:

a first measurement circuit to measure the time difference between the transmission of the pulse-shaped signal and reception of an echo pulse;
a second measurement circuit to measure a phase difference between the transmitted pulse-shaped signal and the echo pulse; and
an evaluation circuit to determine a distance as the distance of the measured object, which distance is compatible with the measured time difference and the measured phase difference after taking into account the propagation speed of the signal, characterized by a logarithmation circuit which includes a cascade of saturable limiters, detectors, and a summation circuit, where the output of each limiter is connected, except the last one, to the input of a following limiter and to an input of a detector, and where the outputs of the detectors are connected to the inputs of a summation circuit, the output of which supplies the logarithmized echo signal to the first measurement circuit, and where the output of the last limiter supplies an input signal for the second measurement circuit.

15. The circuit arrangement of claim 14, further comprising a differentiating circuit to differentiate the output signal of the last limiter is placed before the second measurement circuit.

16. The circuit arrangement of claim 14, comprising a low-pass filter is placed before the first measurement circuit.

17. The circuit arrangement of claim 16, wherein the measurement circuits and the low-pass filter are implemented by a microcontroller, and that an AD converter is located between the output of the logarithmation circuit and an input of the microcontroller.

18. The circuit arrangement of claim 16, wherein the measurement circuits and the low-pass filter are implemented by a microcontroller, and an AD converter is located between the output of the logarithmation circuit and an input of the microcontroller, as well as between the output of the last limiter and an input of the microcontroller.

Signed and Sealed this

Twenty-fifth Day of January, 2005

JON W. DUDAS
*Director of the United States Patent and Trademark Office*